United States Patent
Park et al.

(10) Patent No.: US 10,226,914 B2
(45) Date of Patent: Mar. 12, 2019

(54) FLEXIBLE METAL LAMINATE

(71) Applicant: SHENGYI TECHNOLOGY CO., LTD., Dongguan, Guangdong (CN)

(72) Inventors: Si Young Park, Daejeon (KR); Soon Yong Park, Daejeon (KR); Se Myung Jang, Daejeon (KR); Young Seok Park, Daejeon (KR)

(73) Assignee: SHENGYI TECHNOLOGY CO., LTD., Dongguan, Guangdong (CN)

( * ) Notice: Subject to any disclaimer, the term of this patent is extended or adjusted under 35 U.S.C. 154(b) by 519 days.

(21) Appl. No.: 14/940,590

(22) Filed: Nov. 13, 2015

(65) Prior Publication Data

US 2016/0136933 A1    May 19, 2016

(30) Foreign Application Priority Data

Nov. 18, 2014 (KR) .......................... 10-2014-0160983

(51) Int. Cl.

| | | |
|---|---|---|
| *B32B 7/02* | (2006.01) | |
| *B32B 27/28* | (2006.01) | |
| *B32B 27/08* | (2006.01) | |
| *B32B 15/08* | (2006.01) | |
| *B32B 7/12* | (2006.01) | |
| *B32B 15/09* | (2006.01) | |
| *B32B 15/092* | (2006.01) | |
| *B32B 15/095* | (2006.01) | |
| *B32B 15/098* | (2006.01) | |
| *B32B 27/26* | (2006.01) | |
| *B32B 27/36* | (2006.01) | |
| *B32B 27/38* | (2006.01) | |
| *B32B 27/40* | (2006.01) | |
| *B32B 27/42* | (2006.01) | |

(52) U.S. Cl.
CPC .............. *B32B 27/281* (2013.01); *B32B 7/12* (2013.01); *B32B 15/08* (2013.01); *B32B 15/09* (2013.01); *B32B 15/092* (2013.01); *B32B 15/095* (2013.01); *B32B 15/098* (2013.01); *B32B 27/08* (2013.01); *B32B 27/26* (2013.01); *B32B 27/283* (2013.01); *B32B 27/36* (2013.01); *B32B 27/38* (2013.01); *B32B 27/40* (2013.01); *B32B 27/42* (2013.01); *B32B 2255/10* (2013.01); *B32B 2255/205* (2013.01); *B32B 2262/0269* (2013.01); *B32B 2262/101* (2013.01); *B32B 2262/103* (2013.01); *B32B 2262/105* (2013.01); *B32B 2262/106* (2013.01)

(58) Field of Classification Search
CPC ....... B32B 15/08; B32B 15/09; B32B 15/092; B32B 15/095; B32B 15/098; B32B 27/08; B32B 27/26; B32B 27/281; B32B 27/283; B32B 27/36; B32B 27/38; B32B 27/40; B32B 27/42; B32B 7/12; B32B 2255/10; B32B 2255/205; B32B 2262/0269; B32B 2262/101; B32B 2262/103; B32B 2262/105; B32B 2262/106
USPC .................................................. 428/212–220
See application file for complete search history.

(56) References Cited

U.S. PATENT DOCUMENTS

| | | | | |
|---|---|---|---|---|
| 5,374,469 A | * | 12/1994 | Hino ...................... | H05K 1/036 428/209 |
| 6,729,022 B2 | * | 5/2004 | Kurita ..................... | H05K 3/005 29/830 |
| 2005/0100719 A1 | * | 5/2005 | Kanakarajan ........... | B32B 15/08 428/209 |
| 2009/0142607 A1 | * | 6/2009 | Narui .................. | B29C 47/0021 428/458 |
| 2009/0311519 A1 | * | 12/2009 | Nagata .................... | B32B 27/34 428/336 |

FOREIGN PATENT DOCUMENTS

| | | |
|---|---|---|
| CN | 1929716 A | 3/2007 |
| CN | 103906811 A | 7/2014 |
| CN | 103958188 A | 7/2014 |
| JP | 07-329256 A | 12/1995 |
| JP | 2900400 B2 | 6/1999 |
| JP | 2003-251773 A | 9/2003 |
| JP | 2004-216830 A | 8/2004 |
| JP | 2007-098905 A | 4/2007 |
| JP | 2008-056897 A | 3/2008 |
| JP | 2008-230035 A | 10/2008 |
| JP | 4237694 B2 | 3/2009 |
| JP | 2009-269372 A | 11/2009 |
| JP | 2009-286094 A | 12/2009 |
| JP | 2010-157571 A | 7/2010 |
| JP | 2011-051203 A | 3/2011 |
| JP | 2014-526399 A | 10/2014 |
| KR | 10-2009-0018061 A | 2/2009 |
| KR | 10-2013-0027442 A | 3/2013 |

(Continued)

OTHER PUBLICATIONS

KR-20130027442-A Translation.*

*Primary Examiner* — Travis M Figg
(74) *Attorney, Agent, or Firm* — Rothwell, Figg, Ernst & Manbeck, P.C.

(57) ABSTRACT

Disclosed herein is a flexible metal laminate including: a first thermosetting polyimide resin layer containing 5 wt % to 75 wt % of a fluorine-based resin; a second thermosetting polyimide resin layer formed on at least one surface of the first thermosetting polyimide resin layer, and containing 1 wt % or less of the fluorine-based resin; and a thermoplastic polyimide resin layer formed on one surface of the second thermosetting polyimide resin layer so as to face the first thermosetting polyimide resin layer, wherein the first thermosetting polyimide resin layer and the second thermosetting polyimide resin layer include the same thermosetting polyimide resin.

12 Claims, No Drawings

(56) References Cited

FOREIGN PATENT DOCUMENTS

| | | | |
|---|---|---|---|
| KR | 20130027442 A | * | 3/2013 |
| KR | 10-1344006 B1 | | 12/2013 |
| KR | 10-1375276 B1 | | 3/2014 |
| WO | 2006-107043 A1 | | 10/2006 |
| WO | 2007-132529 A1 | | 11/2007 |

* cited by examiner

FLEXIBLE METAL LAMINATE

CROSS-REFERENCE TO RELATED APPLICATION

This application claims the benefit of Korean Patent Application No. 10-2014-0160983 filed on Nov. 18, 2014 with the Korean Intellectual Property Office, the disclosure of which is herein incorporated by reference in its entirety.

BACKGROUND OF THE INVENTION (a) Field of the Invention

The present invention relates to a flexible metal laminate, and more particularly, to a flexible metal laminate implementing a low dielectric constant, a high degree of elasticity, and an optimized thermal expansion coefficient, and also having a solid internal structure and high interlayer bonding strength.

(b) Description of the Related Art

A flexible metal laminated board is mainly used as a base material of a flexible printed circuit board, and additionally, is used in cotton heating elements, electromagnetic shield materials, flat cables, packaging materials, and the like.

Among the flexible metal laminated boards, there is a flexible copper foil laminated board that includes a polyimide layer and a copper foil layer, and it may be divided into a bonded type and a non-bonded type depending on whether there is an epoxy adhesive layer between the polyimide layer and the copper foil layer.

Herein, the non-bonded flexible copper foil laminated board is formed by directly bonding polyimide on a surface of copper foil, and according to recent trends of miniaturization and thickness reduction of electronic products, and of requiring an excellent ion migration property, the non-bonded type of flexible copper foil laminated board is mainly used.

Further, in accordance with trends of miniaturization and acceleration of electronic equipment, and combination of various functions, there has been a demand to improve a signal transmission speed to the inside or outside of electronic equipment.

Accordingly, development of a printed circuit board using an insulator having lower dielectric constant and dielectric loss factor than existing insulators is demanded.

Recently, reflecting these trends, an attempt has been made to use a liquid crystalline polymer (LCP) which is an insulator having a lower dielectric constant and a smaller effect on moisture absorption than a conventional polyimide in the flexible printed circuit board.

However, LCP does not have a better dielectric constant (Dk=2.9) than that of polyimide (Dk=3.2), has too low thermal resistance, and has poor compatibility with an existing PCB manufacturing process using polyimide. Therefore, a study on lowering the dielectric constant of the previously used polyimide has been conducted, rather than using LCP.

Meanwhile, although a flexible metal laminated board containing a fluorine resin represents a low dielectric constant and also has excellent applicability on a printed circuit board, the fluorine resin has been detected in an interface of a thermosetting polyimide layer in which the fluorine resin is dispersed, thereby lowering its adhesion to a thermoplastic polyimide layer.

Accordingly, a study on a flexible metal laminated board maintaining the dielectric constant and dielectric loss factor of the existing flexible metal laminated board containing the fluorine resin, and also having excellent interfacial adhesive strength, is currently required.

SUMMARY OF THE INVENTION

The present invention has been made in an effort to provide a flexible metal laminate having advantages of implementing a low dielectric constant, a high degree of elasticity, and an optimized thermal expansion coefficient, and also having a solid internal structure and high interlayer bonding strength.

An exemplary embodiment of the present invention provides a flexible metal laminate including: a first thermosetting polyimide resin layer containing 5 wt % to 75 wt % of a fluorine-based resin; a second thermosetting polyimide resin layer formed on at least one surface of the first thermosetting polyimide resin layer, and containing 1 wt % or less of the fluorine-based resin; and a thermoplastic polyimide resin layer formed on one surface of the second thermosetting polyimide resin layer so as to face the first thermosetting polyimide resin layer, wherein the first thermosetting polyimide resin layer and the second thermosetting polyimide resin layer include the same thermosetting polyimide resin.

Hereinafter, the flexible metal laminate according to a specific exemplary embodiment of the present invention will be described in detail.

As described above, according to an embodiment of the present invention, a flexible metal laminate may be provided, including: a first thermosetting polyimide resin layer containing 5 wt % to 75 wt % of a fluorine-based resin; a second thermosetting polyimide resin layer formed on at least one surface of the first thermosetting polyimide resin layer, and containing 1 wt % or less of the fluorine-based resin; and a thermoplastic polyimide resin layer formed on one surface of the second thermosetting polyimide resin layer so as to face the first thermosetting polyimide resin layer, wherein the first thermosetting polyimide resin layer and the second thermosetting polyimide resin layer include the same thermosetting polyimide resin.

In case of the conventional flexible metal laminated board containing a fluorine resin, the fluorine resin was detected in an interface of a thermosetting polyimide layer in which the fluorine resin is dispersed, thereby lowering its adhesion to a thermoplastic polyimide layer.

In a polymer resin layer such as a polyimide resin layer used in a manufacturing process of the flexible metal laminate, the fluorine-based resin may be driven to the surface rather than the inside, and when this polymer resin layer is exposed to a high temperature which may be applied in a manufacturing process of a flexible metal laminate or a printed circuit board, for example, a temperature of around 380° C., the fluorine-based resin may melt, or each portion of the flexible metal laminate or the printed circuit board may be delaminated.

Further, the thermosetting resin containing the fluorine-based resin had low adhesive strength to the thermoplastic polymer resin, so that delamination easily occurs in the interface of the thermosetting resin and the thermoplastic resin layer.

Thus, the present inventors proceeded with research on the flexible metal laminate, and as a result, confirmed through an experiment that when on a first thermosetting polyimide resin layer, a second thermosetting polyimide resin layer including the same thermosetting polyimide resin as that included in the first thermosetting polyimide resin layer, and containing 1 wt % or less of a fluorine-based resin is formed, melting of the fluorine-based resin, or delamination of each portion of the flexible metal laminate depending on high temperature exposure, may be prevented, and in particular, the second thermosetting polyimide resin layer may have high adhesive strength to the thermoplastic polyimide resin layer, and thus completed the present invention.

Accordingly, the flexible metal laminate of the exemplary embodiment may implement a low dielectric constant, a high degree of elasticity, and an optimized thermal expansion coefficient, and may also have a solid internal structure and high interlayer bonding strength.

Specifically, interfacial peel strength between the second thermosetting polyimide resin layer and the thermoplastic polyimide resin layer may be 1.0 kgf/cm or more, 1.0 kgf/cm to 3.0 kgf/cm, or 1.1 kgf/cm to 2.0 kgf/cm.

The interfacial peel strength may be defined as interfacial peel strength at 180° using a universal testing machine (UTM) according to IPC-TM-650 Method 2.4.9.

The first thermosetting polyimide resin layer may have a thickness of 1 µm to 100 µm, or 2 µm to 50 µm.

The second thermosetting polyimide resin layer may have a thickness of 0.1 µm to 50 µm, or 1 µm to 10 µm.

A thickness ratio of the second thermosetting polyimide resin layer to the first thermosetting polyimide resin layer may be 0.01 to 1, or 0.05 to 0.5. When the entire second polyimide resin layer is too thin, an improvement effect of a degree of elasticity and elongation may be insignificant, and the fluorine-based resin melted at high temperature included in the first thermosetting polyimide resin layer may be transferred in the manufacturing process of the flexible metal laminate or the printed circuit board.

When the entire second thermosetting polyimide resin layer is too thick, the content of the fluorine-based resin in the flexible metal laminate may be too low, so that it is difficult to secure a low dielectric constant.

The thermoplastic polyimide resin layer may have a thickness of 0.1 µm to 100 µm. A thickness ratio of the thermoplastic polyimide resin layer to the first thermosetting polyimide resin layer may be 0.01 to 1, or 0.05 to 0.5.

Meanwhile, the flexible metal laminate of the exemplary embodiment may include a structure in which the second thermosetting polyimide resin layer is formed on one surface of the first thermosetting polyimide resin layer, and the thermoplastic polyimide resin layer is formed on the opposite surface to the surface of the second thermosetting polyimide resin layer in contact with the first thermosetting polyimide resin layer.

Further, the flexible metal laminate may also include a structure in which the second thermosetting polyimide resin layer is formed on both surfaces of the first thermosetting polyimide resin layer, respectively, and the thermoplastic polyimide resin layer is formed on the opposite surfaces to the surfaces of the second thermosetting polyimide resin layers in contact with the first thermosetting polyimide resin layer, respectively.

Meanwhile, the first thermosetting polyimide resin layer may contain 5 wt % to 75 wt %, or 10 wt % to 60 wt % of the fluorine-based resin, and a residual amount of the thermosetting polyimide resin, and may selectively further include other additives.

The first thermosetting polyimide resin layer should contain 5 wt % or more, or 10 wt % or more of the fluorine-based resin in order to sufficiently lower the dielectric constant, and may contain 75 wt % or less of the fluorine-based resin in order to prevent the elongation of the first thermosetting polyimide resin layer from being excessively lowered, or the thermal expansion coefficient of the first thermosetting polyimide resin layer from being excessively increased.

The fluorine-based resin may be one or more selected from the group consisting of polytetrafluoroethylene (PTFE), a tetrafluoroethylene-perfluoroalkylvinylether copolymer (PFA), a tetrafluoroethylene-hexfluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

The fluorine-based resin may be particles having a longest diameter of 0.05 µm to 20 µm, or 0.1 µm to 10 µm. When the longest diameter of the fluorine-based resin is too short, a surface area of the fluorine-based resin may be increased, thereby lowering the physical properties of the first thermosetting polyimide resin layer. Further, when the longest diameter of the fluorine-based resin is too long, the surface properties of the first thermosetting polyimide resin layer may be deteriorated.

As described above, the second thermosetting polyimide resin layer may include 1 wt % or less, or 0.1 wt % or less of the fluorine-based resin, or substantially no fluorine-based resin.

The first thermosetting polyimide resin layer or the second thermosetting polyimide resin layer may include the same thermosetting polyimide resin.

The first thermosetting polyimide resin layer or the second thermosetting polyimide resin layer may include the thermosetting polyimide resin having a weight average molecular weight of 5000 to 500,000.

When the thermosetting polyimide resin has too low a weight average molecular weight, the first thermosetting polyimide resin layer or the second thermosetting polyimide resin layer may not sufficiently secure mechanical physical properties and the like, which are required when applied to the flexible metal laminate and the like. Further, when the thermosetting polyimide resin has too high a weight average molecular weight, the first thermosetting polyimide resin layer or the second thermosetting polyimide resin may have a lowered degree of elasticity or deteriorated mechanical properties.

The first thermosetting polyimide resin layer or the second thermosetting polyimide resin layer may include the thermosetting polyimide resin containing repeating units of the following Chemical Formula 1:

[Chemical Formula 1]

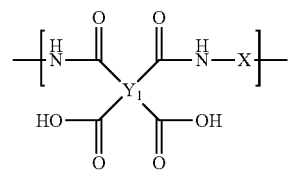

wherein $Y_1$ is a tetravalent aromatic organic functional group, and X is a divalent aromatic organic functional group.

$Y_1$ may include a tetravalent functional group selected from the group consisting of Chemical Formula 21 to 27:

[Chemical Formula 21]

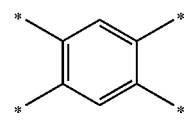

[Chemical Formula 22]

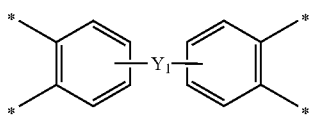

wherein $Y_1$ is a single bond, —O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, or —OC(CH$_2$)n$_3$OCO—, in which $n_1$, $n_2$, and $n_3$ are an integer of 1 to 10, respectively,

[Chemical Formula 23]

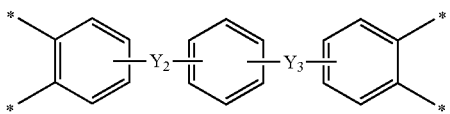

wherein $Y_2$ and $Y_3$ are identical to or different from each other, and are a single bond, —O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, or —OCO(CH$_2$)n$_3$OCO—, respectively, in which $n_1$, $n_2$, and $n_3$ are an integer of 1 to 10, respectively,

[Chemical Formula 24]

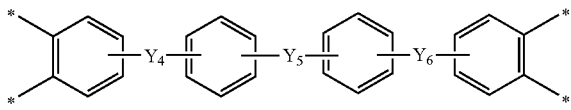

wherein $Y_4$, $Y_5$, and $Y_6$ are identical to or different from each other, and are a single bond, —O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, or —OCO(CH$_2$)n$_3$OCO—, respectively, in which $n_1$, $n_2$, and $n_3$ are an integer of 1 to 10, respectively,

[Chemical Formula 25]

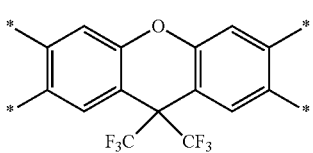

[Chemical Formula 26]

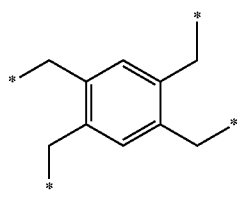

[Chemical Formula 27]

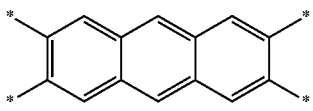

wherein '*' is a bonding point in Chemical Formula 21 to 27.

Further, in order for the first thermosetting polyimide resin layer and the second thermosetting polyimide resin layer to have a relatively low dielectric constant and low water absorption, and also secure a high degree of elasticity and an optimized thermal expansion coefficient, it is preferred that $Y_1$ in Chemical Formula 1 is a tetravalent functional group selected from the group consisting of the following Chemical Formula 28 to 30. Herein $Y_1$ may be identical to or different from each other in each repeating unit of Chemical Formula 1.

[Chemical Formula 28]

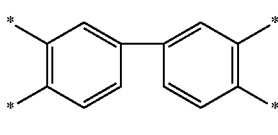

[Chemical Formula 29]

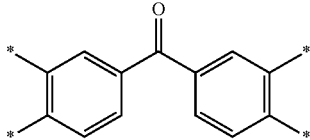

[Chemical Formula 30]

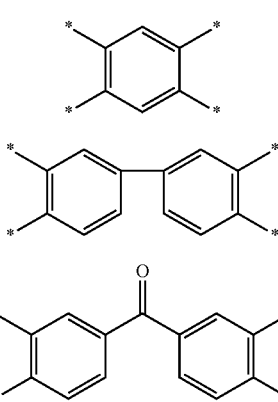

Herein, '*' is a bonding point in Chemical Formula 28 to 30.

Meanwhile, in Chemical Formula 1, X may be a divalent functional group selected from the group consisting of the following Chemical Formula 31 to 34.

[Chemical Formula 31]

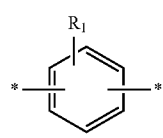

Herein, $R_1$ is hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$.

[Chemical Formula 32]

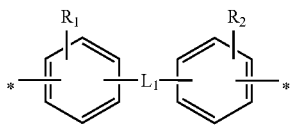

Herein, $L_1$ is a single bond, —O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, or —OCO(CH$_2$)n$_3$OCO—, respectively, in which $n_1$, $n_2$, and $n_3$ are an integer of 1 to 10, respectively, and $R_1$ and $R_2$ are identical to or different from each other, and are hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$, respectively.

[Chemical Formula 33]

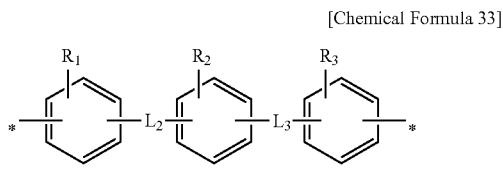

Herein, $L_2$ and $L_3$ are identical to or different from each other, and are a single bond, —O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, or —OCO(CH$_2$) n$_3$OCO—, respectively, in which $n_1$, $n_2$, and $n_3$ are an integer of 1 to 10, respectively, and $R_1$, $R_2$, and $R_3$ are identical to or different from each other, and are hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$, respectively.

[Chemical Formula 34]

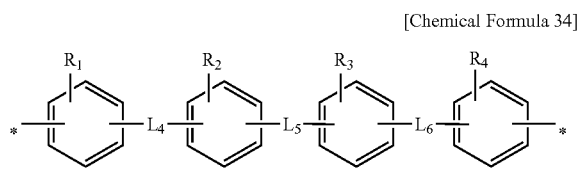

Herein, $L_4$, $L_5$, and $L_6$ are identical to or different from each other, and are a single bond, O—, —CO—, —S—, —SO$_2$—, —C(CH$_3$)$_2$—, —C(CF$_3$)$_2$—, —CONH—, —COO—, —(CH$_2$)n$_1$-, —O(CH$_2$)n$_2$O—, or —OCO(CH$_2$) n$_3$OCO—, respectively, in which $n_1$, $n_2$, and $n_3$ are an integer of 1 to 10, respectively, and $R_1$, $R_2$, $R_3$, and $R_4$ are identical to or different from each other, and are hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$, respectively.

Particularly, when X in Chemical Formula 1 is a divalent functional group of the following Chemical Formula 35, the polyimide resin layer may have a relatively low relative dielectric constant and low water absorption, and may also secure a high degree of elasticity and an optimized thermal expansion coefficient.

Herein, X may be identical to or different from each other in each repeating unit of Chemical Formula 1.

[Chemical Formula 35]

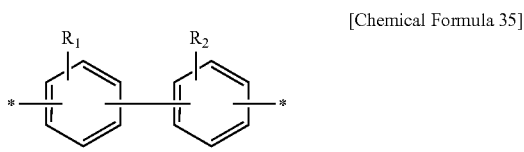

Herein, $R_1$ and $R_2$ are identical to or different from each other, and are hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$, respectively.

The thermoplastic polyimide resin layer may be used in the flexible metal laminate, and may include a commonly known thermoplastic polyimide resin. For example, the thermoplastic polyimide resin may have a coefficient of linear thermal expansion in a range of 10 to 80 ppm/K, and a thermoplastic property of an adhesive strength to a metal thin film such as copper foil adhered in a high temperature lamination manner of 0.5 kgf/cm or 0.8 kgf/cm or more.

The thermoplastic polyimide resin includes repeating units having a lower molecular weight and higher flexibility than the above-described thermosetting resin. For example, the thermoplastic resin may be prepared by reacting a tetracarboxylic anhydride such as biphenyl tetracarboxylic acid dianhydride, pyromellitic dianhydride (PMDA), and the like, and an amine compound such as 4,4'-oxydianlline, (4-aminophenoxy)benzene, 2.2'-bis[4-(4-aminophenoxy) phenyl]propane, and the like, and in this reaction, a commonly known monomer of the thermoplastic polyimide resin may be used without a particular limitation.

In addition, the flexible metal laminate may further include at least one metal thin film containing one or more selected from the group consisting of copper, iron, nickel, titanium, aluminum, silver, gold, and an alloy of two or more thereof.

Specifically, the flexible metal laminate may include one metal thin film, or may include two metal thin films facing each other, and in this case, the first thermosetting polyimide resin layer, the second thermosetting polyimide resin layer, and the thermoplastic polyimide resin layer may be disposed between the two metal thin films facing each other.

A surface of the metal thin film may have a ten-point average roughness (Rz) of 0.5 to 2.5 μm. When the metal thin film surface has too low a ten-point average roughness, the adhesive strength to the polyimide resin layer or a porous polymer resin layer may be lowered, and when the metal thin film surface has too high a ten-point average roughness, surface roughness may be increased, thereby increasing a transmission loss in a high frequency region.

The metal thin film may have a thickness of 0.1 μm to 50 μm.

The first thermosetting polyimide resin layer of the exemplary embodiment may represent a dielectric constant at 5 GHz of 2.9 (Dk) or less, or 2.2 to 2.8 (Dk), or 2.3 to 2.7 (Dk) in a dry state. The common polyimide resin generally has a dielectric constant at 5 GHz of 3.0 or more in a dry state, whereas the first thermosetting polyimide resin layer may have a relatively low dielectric constant.

Further, a composite of all of the first thermosetting polyimide resin layer, the second thermosetting polyimide resin layer, and the thermoplastic polyimide resin layer may have a thermal expansion coefficient of 1 ppm to 28 ppm at 100° C. to 200° C. Since the copper foil which is the metal foil commonly used in the flexible metal laminate has a thermal expansion coefficient of about 18 ppm, the polyimide resin layer should have the thermal expansion coefficient as described above, thereby minimizing warpage generated from a difference in the thermal expansion coefficient from that of the metal foil, and minimizing a stretch difference from other materials forming the printed circuit board.

Meanwhile, the manufacturing method of the above-described flexible metal laminate is not significantly limited, and a synthetic method of a polyimide resin and a manufacturing method of a flexible metal laminate which are commonly known may be used.

The polyimide resin included in the first thermosetting polyimide resin layer, the second thermosetting polyimide resin layer, and the thermoplastic polyimide resin layer may be obtained by applying and drying a polymer resin solution containing polyamic acid as a precursor, and thereafter, carrying out heat treatment at a high temperature of 250° C. to 400° C.

Further, the polyamic acid as the precursor of the polyimide resin may be obtained by reacting tetracarboxylic acid or an anhydride thereof with a diamine compound. For example, the thermosetting polyimide resin included in the first thermosetting polyimide resin layer and the second thermosetting polyimide resin layer may be obtained by reacting the tetracarboxylic acid containing the tetravalent functional group selected from the group consisting of Chemical Formula 21 to 27 or an anhydride thereof with the diamine compound containing the divalent functional group selected from the group consisting of Chemical Formula 31 to 34.

A resin composition including the polyamic acid as the precursor of the polyimide and selectively a fluorine-based resin may include an organic solvent, and examples of usable organic solvents are not significantly limited, and may include, for example, N,N'-dimethylformamide, N,N'-dimethylacetamide, N,N'-diethylacetmaide, N,N'-dimethylmetoxyacetamide, N-methyl-2-pyrrolidone, N-methylcaprolactam, 1,3-dimethyl-2-imidazolidone, 1,2-dimethoxyethane, 1,3-dioxein, 1,4-dioxein, pyridine, picoline, dimethylsulfoxide, dimethylsulfone, m-cresol, p-chlorophenol, anisole, and the like, alone or in a combination of two or more thereof. Herein, a usable amount of the organic solvent may be about 1 to 10 times the total solid content of the resin composition.

According to the present invention, the flexible metal laminate implementing a low dielectric constant, a high degree of elasticity, and an optimized thermal expansion coefficient, and also having a solid internal structure and high interlayer bonding strength, may be provided.

DETAILED DESCRIPTION OF THE EMBODIMENTS

The present invention will be described in detail in the following examples. However, the following examples are only illustrative of the present invention, and the description of the present invention is not limited thereto.

Preparation Example: Preparation of Polyamic Acid Solution

Preparation Example 1: Preparation of Polyamic Acid Solution Including Fluorine-Based Resin (P1)

A 1 L polyethylene (PE) bottle was charged with nitrogen, and 765 g of dimethylacetamide (DMAc), 160 g of polytetrafluoroethylene (PTFE) micropowder (particle size: 0.1 to 2.0 μm), and 765 g of beads having a diameter of 2 mm were added to the bottle, and PTFE was dispersed therein while stirring in a high speed ball milling device.

To a 500 mL round-bottom flask, 19.5 g of the solution in which PTFE is dispersed, 154 g of dimethylacetamide, 12.15 g of pyromellitic dianhydride, and 17.85 g of 2,2'-bis(trifluoromethyl)-4,4'-diaminobiphenyl were added, and stirring was carried out using a stirrer while nitrogen was flowed therein at 50° C. for 10 hours, thereby obtaining a polyamic acid solution (P1) having density of about 20,000 cps. (A PTFE content in the solid content: 10 wt %)

Preparation Example 2: Preparation of Polyamic Acid Solution (P2)

To a 500 mL round-bottom flask, 154 g of dimethylacetamide, 12.15 g of pyromellitic dianhydride, and 17.85 g of 2,2'-bis(trifluoromethyl)-4,4'-diaminobiphenyl were added, and stirring was carried out using a stirrer while nitrogen was flowed therein at 50° C. for 10 hours, thereby obtaining a polyamic acid solution (P2) having density of about 20,000 cps.

Preparation Example 3: Preparation of Thermoplastic Polyamic Acid Solution (P2)

To a 500 mL round-bottom flask, 154 g of dimethylacetamide, 9 g of pyromellitic dianhydride (PMDA), and 17 g of 2,2'-bis[4](4-aminophenoxy)phenylpropane were added, and stirring was carried out using a stirrer while nitrogen was flowed therein at 50° C. for 10 hours, thereby obtaining a polyamic acid solution (P3) having density of about 3000 cps.

Example and Comparative Example: Manufacture of Flexible Metal Laminate

On a matte surface of copper foil (thickness: 12 μm), the polyamic acid solutions of the preparation examples were coated in the described order, and dried at 100° C. for 10 minutes each time after coating the polyamic acid solution. Further, after completing the coating and drying, the dried product started to be heated in a nitrogen oven from room temperature to 350° C., and was cured at 350° C. for 30 minutes.

After the curing was completed, copper foil was laminated (thickness: 12 μm) on the surface of the cured product with pressure of 1700 kgf/cm at a temperature of 370° C., thereby manufacturing a flexible metal laminate.

TABLE 1

|  | Application order of polyamic acid solution | Thickness of each layer [μm] | Peel strength between layer 1) and layer 2) |
|---|---|---|---|
| Example (total thickness: 24.8 μm) | 1) Preparation Example 3 | 1.8 | 1.4 kgf/cm |
|  | 2) Preparation Example 2 | 1.6 |  |
|  | 3) Preparation Example 1 | 18 |  |
|  | 4) Preparation Example 2 | 1.6 |  |
|  | 5) Preparation Example 3 | 1.8 |  |
| Comparative Example (total thickness: 25 μm) | 1) Preparation Example 3 | 2.0 | 0.7 kgf/cm |
|  | 2) Preparation Example 1 | 21 |  |
|  | 3) Preparation Example 3 | 2.0 |  |

* Peel strength between layers 1) and 2) is interfacial peel strength at 180° using an universal testing machine (UTM) according to IPC-TM-650 Method 2.4.9.

As shown in above Table 1, it was confirmed that the flexible metal laminate of the examples has peel strength of 1.4 kgf/cm between the thermoplastic polyimide resin layer and the thermosetting polyimide resin layer not containing the fluorine-based resin, which is twice the corresponding peel strength of the comparative examples.

In addition, the second thermosetting polyimide resin layer (prepared from the polyamic acid of Preparation Example 2) not containing the fluorine-based resin is formed on both surfaces of the first thermosetting polyimide resin layer (prepared from the polyamic acid of Preparation Example 1), thereby preventing the phenomenon that the fluorine-based resin contained in the first thermosetting polyimide resin layer is melted or released to the outside due to a high temperature condition which may be applied in a manufacturing process of the flexible metal laminate or the printed circuit board.

That is, the flexible metal laminate of the examples may implement a low dielectric constant, a high degree of elasticity, and an optimized thermal expansion coefficient due to the first thermosetting polyimide resin layer containing the fluorine-based resin, and also secure a solid internal structure and high interlayer bonding strength due to the certain structure as described above.

What is claimed is:

1. A flexible metal laminate consisting of:
a first thermosetting polyimide resin layer containing 5 wt % to 75 wt % of a fluorine-based resin;
a second thermosetting polyimide resin layer formed on at least one surface of the first thermosetting polyimide resin layer, and containing 1 wt % or less of the fluorine-based resin;
a thermoplastic polyimide resin layer formed on one surface of the second thermosetting polyimide resin layer so as to face the first thermosetting polyimide resin layer, and
at least one metal thin film consisting of one or more metals selected from the group consisting of copper, iron, nickel, titanium, aluminum, silver, gold, and an alloy of two or more thereof, and having a thickness of 0.1 μm to 50 μm,
wherein the first thermosetting polyimide resin layer and the second thermosetting polyimide resin layer include the same thermosetting polyimide resin; and
wherein the at least one metal thin film comprises two metal thin films facing each other, and the first thermosetting polyimide resin layer, the second thermosetting polyimide resin layer, and the thermoplastic polyimide resin layer are disposed between the two metal thin films facing each other.

2. The flexible metal laminate of claim 1, wherein interfacial peel strength between the second thermosetting polyimide resin layer and the thermoplastic polyimide resin layer is 1.0 kgf/cm or more.

3. The flexible metal laminate of claim 1, wherein the first thermosetting polyimide resin layer has a thickness of 1 μm to 100 μm.

4. The flexible metal laminate of claim 1, wherein the second thermosetting polyimide resin layer has a thickness of 0.1 μm to 50 μm.

5. The flexible metal laminate of claim 1, wherein a thickness ratio of the second thermosetting polyimide resin layer to the first thermosetting polyimide resin layer is 0.01 to 1.

6. The flexible metal laminate of claim 1, wherein the thermoplastic polyimide resin layer has a thickness of 1 μm to 100 μm.

7. The flexible metal laminate of claim 1, wherein the fluorine-based resin includes one or more selected from the group consisting of polytetrafluoroethylene (PTFE), a tetrafluoroethylene-perfluoroalkylvinylether copolymer (PFA), a tetrafluoroethylene-hexfluoropropylene copolymer (FEP), an ethylene-tetrafluoroethylene copolymer resin (ETFE), a tetrafluoroethylene-chlorotrifluoroethylene copolymer (TFE/CTFE), and an ethylene-chlorotrifluoroethylene resin (ECTFE).

8. The flexible metal laminate of claim 1, wherein the fluorine-based resin is fluorine-based resin particles having a longest diameter of 0.05 μm to 20 μm.

9. The flexible metal laminate of claim 1, wherein the first thermosetting polyimide resin layer or the second thermosetting polyimide resin layer includes a thermosetting polyimide resin having a weight average molecular weight of 5000 to 500,000.

10. The flexible metal laminate of claim 1, wherein the first thermosetting polyimide resin layer or the second thermosetting polyimide resin layer includes a thermosetting polyimide resin containing a repeating unit of the following Chemical Formula 1:

[Chemical Formula 1]

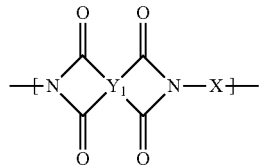

wherein $Y_1$ is a tetravalent aromatic organic functional group, and X is a divalent aromatic organic functional group.

11. The flexible metal laminate of claim 10, wherein $Y_1$ is a tetravalent functional group selected from the group consisting of following Chemical Formula 21 to 27:

[Chemical Formula 21]

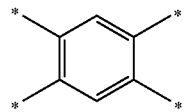

[Chemical Formula 22]

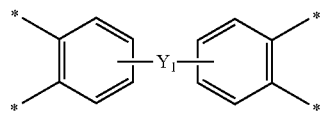

wherein $Y_1$ is a single bond, —O—, —CO—, —S—, —$SO_2$—, —$C(CH_3)_2$—, —$C(CF_3)_2$—, —CONH—, —COO—, —$(CH_2)_{n_1}$-, —$O(CH_2)_{n_2}O$—, or —OCO$(CH_2)_{n_3}OCO$—, respectively, in which $n_1$, $n_2$, and $n_3$ are an integer of 1 to 10, respectively,

[Chemical Formula 23]

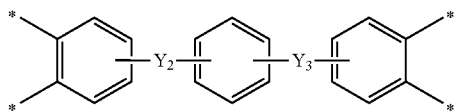

wherein $Y_2$ and $Y_3$ are identical to or different from each other, and are a single bond, —O—, —CO—, —S—, —$SO_2$—, —$C(CH_3)_2$—, —$C(CF_3)_2$—, —CONH—, —COO—, —$(CH_2)_{n_1}$-, —$O(CH_2)_{n_2}O$—, or —OCO$(CH_2)_{n_3}OCO$—, respectively, in which $n_1$, $n_2$, and $n_3$ are an integer of 1 to 10, respectively,

[Chemical Formula 24]

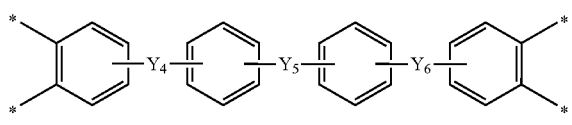

wherein $Y_4$, $Y_5$, and $Y_6$ are identical to or different from each other, and are a single bond, —O—, —CO—, —S—, —SO$_2$—, —C(CH$_3$)$_2$—, —C(CF$_3$)$_2$—, —CONH—, —COO—, —(CH$_2$)$_{n_1}$-, —O(CH$_2$)$_{n_2}$O—, or —OCO(CH$_2$)$_{n_3}$OCO—, respectively, in which $n_1$, $n_2$, and $n_3$ are an integer of 1 to 10, respectively,

[Chemical Formula 25]

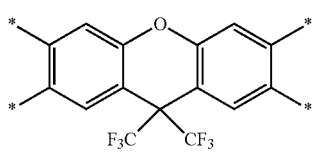

[Chemical Formula 26]

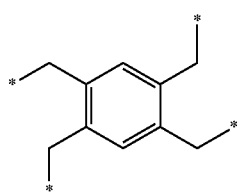

[Chemical Formula 27]

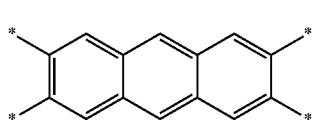

wherein '*' is a bonding point in Chemical Formula 21 to 27.

12. The flexible metal laminate of claim 10, wherein X is a divalent functional group selected from the group consisting of following Chemical Formula 31 to 34:

[Chemical Formula 31]

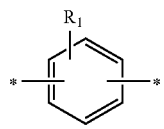

wherein $R_1$ is hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$,

[Chemical Formula 32]

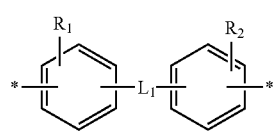

wherein $L_1$ is a single bond, —O—, —CO—, —S—, —SO$_2$—, —C(CH$_3$)$_2$—, —C(CF$_3$)$_2$—, —CONH—, —COO—, —(CH$_2$)$_{n_1}$-, —O(CH$_2$)$_{n_2}$O—, or —OCO(CH$_2$)$_{n_3}$OCO—, respectively, in which $n_1$, $n_2$, and $n_3$ are an integer of 1 to 10, respectively; and $R_1$ and $R_2$ are identical to or different from each other, and are hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$, respectively,

[Chemical Formula 33]

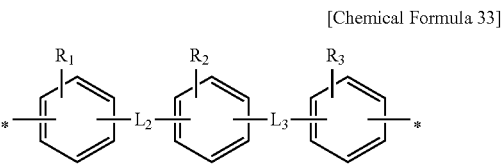

wherein $L_2$ and $L_3$ are identical to or different from each other, and are a single bond, —O—, —CO—, —S—, —SO$_2$—, —C(CH$_3$)$_2$—, —C(CF$_3$)$_2$—, —CONH—, —COO—, —(CH$_2$)$_{n_1}$-, —O(CH$_2$)$_{n_2}$O—, or —OCO(CH$_2$)$_{n_3}$OCO—, respectively, in which $n_1$, $n_2$, and $n_3$ are an integer of 1 to 10, respectively; and $R_1$, $R_2$, and $R_3$ are identical to or different from each other, and are hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$, respectively,

[Chemical Formula 34]

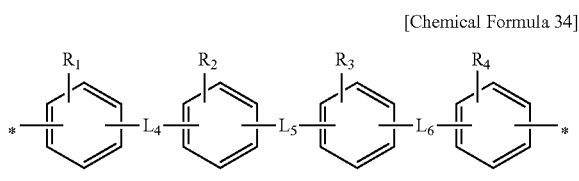

wherein $L_4$, $L_5$, and $L_6$ are identical to or different from each other, and are a single bond, —O—, —CO—, —S—, —SO$_2$—, —C(CH$_3$)$_2$—, —C(CF$_3$)$_2$—, —CONH—, —COO—, —(CH$_2$)$_{n_1}$-, —O(CH$_2$)$_{n_2}$O—, or —OCO(CH$_2$)$_{n_3}$OCO—, respectively, in which $n_1$, $n_2$, and $n_3$ are an integer of 1 to 10, respectively; and $R_1$, $R_2$, $R_3$, and $R_4$ are identical to or different from each other, and are hydrogen, —CH$_3$, —CH$_2$CH$_3$, —CH$_2$CH$_2$CH$_2$CH$_3$, —CF$_3$, —CF$_2$CF$_3$, —CF$_2$CF$_2$CF$_3$, or —CF$_2$CF$_2$CF$_2$CF$_3$, respectively, wherein '*' is a bonding point in Chemical Formula 31 to 34.

* * * * *